Jan. 13, 1959 A. H. FREDRICK 2,869,119
PULSE RADAR TRANSMITTER-RECEIVER
Filed Sept. 27, 1955 3 Sheets-Sheet 1
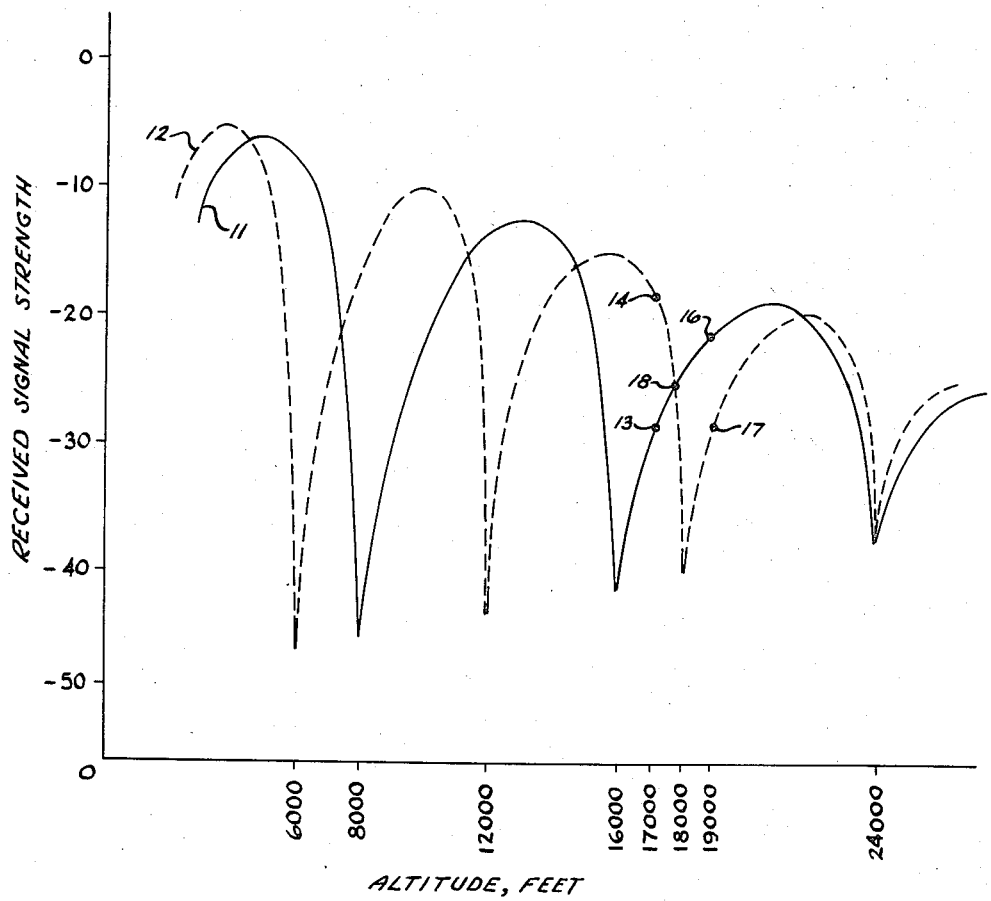
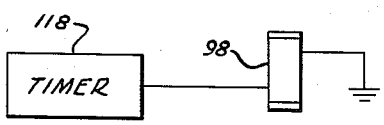
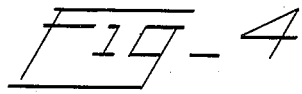
INVENTOR.
ARDEN H. FREDRICK
BY
ATTORNEY

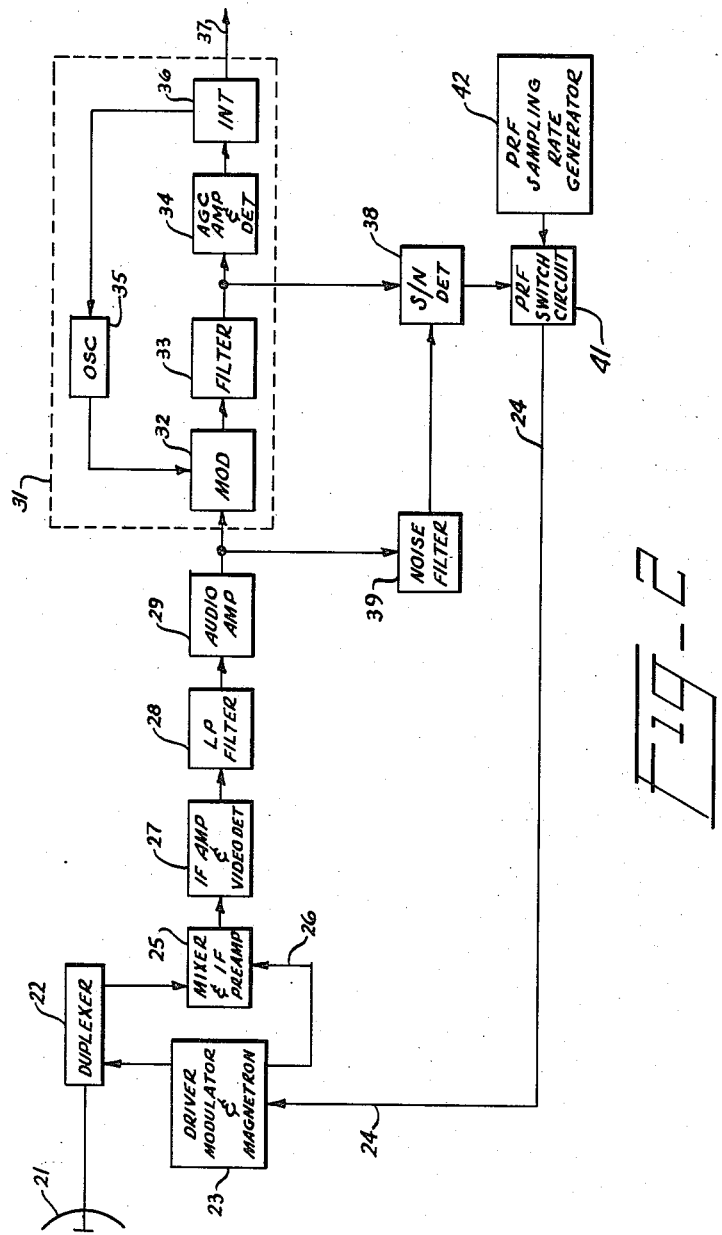

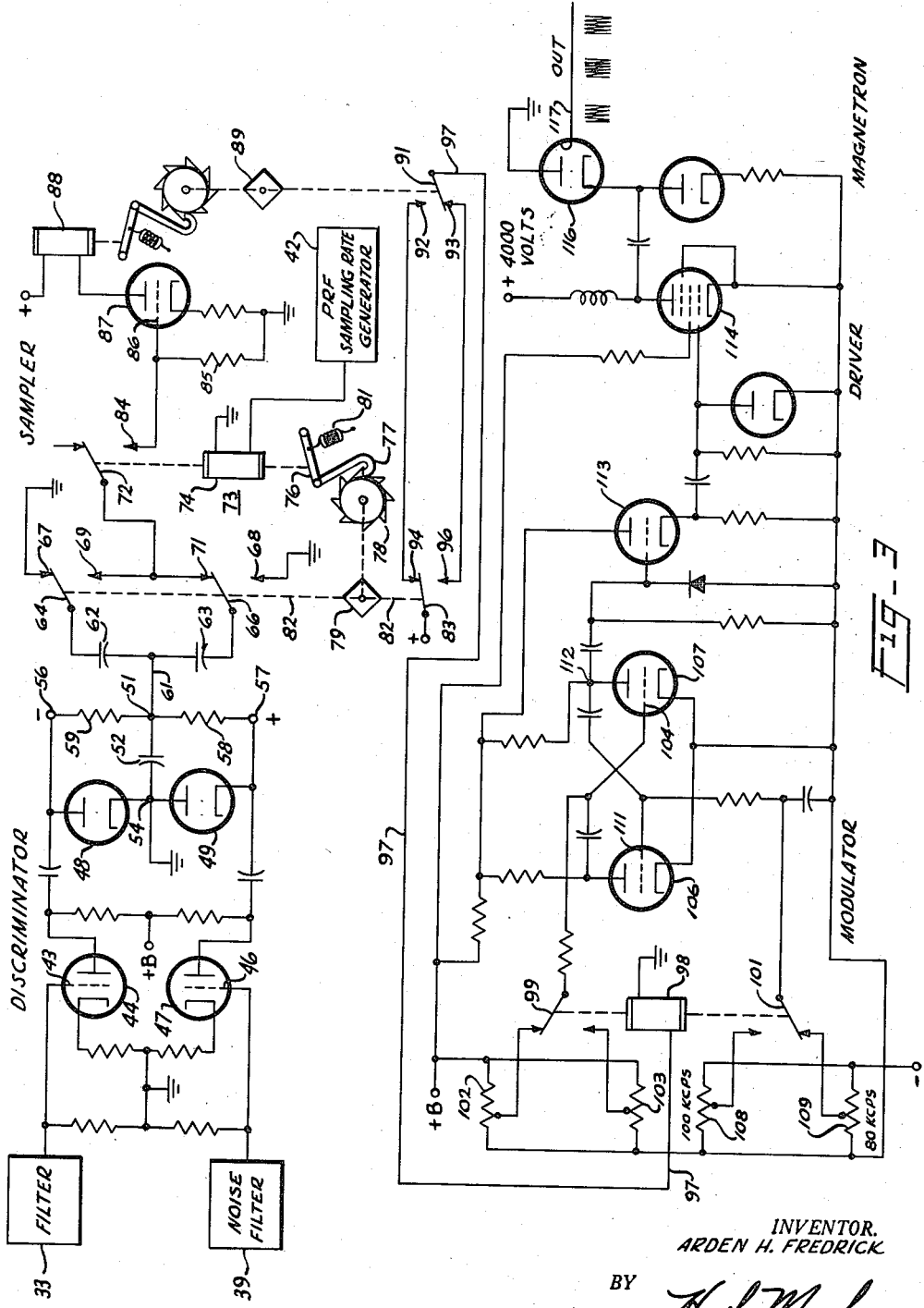

2,869,119

PULSE RADAR TRANSMITTER-RECEIVER

Arden H. Fredrick, Mount Kisco, N. Y., assignor to General Precision Laboratory Incorporated, a corporation of New York Application September 27, 1955, Serial No. 536,867

5 Claims. (Cl. 343—17.1)

This invention relates to Doppler pulse radar apparatus and more specifically to improvements for increasing the strength and accuracy of the reflected and returned energy received by such apparatus.

When a pulse of microwave energy is transmitted from an aircraft obliquely toward the earth in the general direction of aircraft horizontal movement, the pulse of energy is reflected from an area of the earth and may be received by the radar apparatus. The received energy is at a frequency slightly different from the transmitted pulse because of the Doppler effect, and when the received energy is mixed either with a portion of the transmitted pulse, or with the signal of an oscillator coherent therewith, or with a second received beam at a different slant angle, the resulting beat frequency is representative of the aircraft forward speed. The received pulse is longer in time than the transmitted pulse because the area of the earth irradiated by the beam is not all at the same distance from the aircraft.

As is well understood by those skilled in the art, it is necessary in such systems to disable the receiver during the period of occurrence of a transmitted pulse so that this high power signal will not burn out or destroy the delicate receiver elements. This period is known as the receiver blanking time. Thus if the time taken by the radar beam to travel from the aircraft to the earth and back to the aircraft should equal the transmitting pulse repetition period, and if the received pulse were no longer than the receiver blanking time, then no energy would be received because during the time of arrival of the signal pulse at the aircraft the receiver would be inoperative. Actually, the received pulse is usually longer than the receiver blanking time so that some energy is received. Thus, when $$MP = \frac{2h}{c \sin \gamma} \quad (1)$$

in which P is the pulse repetition period, $h$ is the altitude of the aircraft, $c$ is the speed of microwave energy in space, $\gamma$ is the slant or "looking" angle which the microwave beam makes with the horizontal direction, and M is any positive integer, reception is poor or zero. An altitude at which this effect occurs generally is known as the altitude of a "hole," or an altitude "hole." A number of these holes exist, all at different altitudes, depending upon the value of M, for any selected set of values of the pulse repetition period and of the looking angle.

When the aircraft is changing altitude and is either entering or leaving an altitude hole, parts of the beams are effective at the radar receiver while other parts are blanked out, so that the beam energy axis has an angle which is slightly different from the nominal looking angle. Thus the beat frequency or Doppler difference frequency representative of aircraft speed is somewhat in error at such times. This is termed the altitude hole calibration error because it is computed as a change in the calibration of the apparatus in terms of Doppler cycles per knot. Thus altitude holes not only reduce the intensity of the return signal but also affect the accuracy of measurement. It will be seen from Equation 1 that, at the altitude $h$ of a selected altitude hole, if P be changed the equality is no longer true. That is, if the pulse repetition frequency (PRF) be changed the altitudes at which holes occur will be changed. This is the principle upon which this invention is based.

Pulse repetition frequency may be changed either manually or automatically. One way in which it may be changed is as a function of the ratio which the strength of the returned signal bears to noise signal strength ($S/N$). This may be accomplished by switching from time to time from the pulse repetition frequency in use to another frequency, and observing whether $S/N$ be increased or decreased. If decreased, the PRF is returned to its old value but if increased, the new value of PRF is retained.

Another simpler but somewhat less effective way of controlling the pulse repetition frequency is by periodically switching between frequencies.

One purpose of this invention is to reduce the effect of altitude holes upon signal strength and calibration error.

Another purpose is to employ a plurality of pulse repetition frequencies alternatively to improve the signal strength and calibration constancy at all altitudes.

Still another purpose is to switch automatically between or among a plurality of pulse repetition frequencies and to select and use that frequency which results in the better or best signal-to-noise ratio for the altitude.

A further understanding of this invention may be secured by reference to the detailed description and associated drawings, in which, Figure 1 is a graph representing variation or radar received signal strength with altitude employing either of two selected pulse repetition frequencies.

Figure 2 is a block diagram of a radar pulse transmitter-receiver employing the invention.

Figure 3 is a schematic diagram of the magnetron oscillator, pulses and adjustable modulator of the invention together with a signal-to-noise ratio discriminator and switch sampling apparatus for controlling the modulator.

Figure 4 illustrates the use of a timer to vary the pulse repetition frequency.

When a radar transmitter-receiver of the pulse type is installed in an aircraft with its antenna pointed obliquely toward the earth along the ground track, the signal return from the earth varies in strength according to the altitude. A representative curve of strength variation is depicted in curve 11, Fig. 1, the pulse repetition frequency being such as to place the first order minimum at 8,000 ft. Other minima occur at integral multiples of 8,000 ft. When the PRF is changed, keeping the same looking angle, to such greater value as to place the first minimum at 6,000 ft., the dashed curve 12 results, with other minima at multiples of 6,000 ft. Both minima coincide at 24,000 ft., indicating a limitation on the use of only two frequencies, however chosen. The minima also coincide at zero altitude for all pulse repetition frequencies but, since change of pulse repetition frequency cannot improve this zeroeth altitude hole, such improvement is outside of the scope of this invention and must be effected in other ways.

Even when only two alternatively usable pulse repetition frequencies are provided as indicated in the graph, the improvement or degradation of signal strength effected by change of PRF may be clearly demonstrated. If the frequency represented by curve 11 be employed and the aircraft be at 17,000 ft. altitude, the returned signal strength is represented by point 13, and is 29 db below reference strength. If now the frequency be changed to that of curve 12 the signal strength is increased, as indicated, by point 14, to −17 db. But if the aircraft had been at 19,000 ft. altitude this change in PRF would result in a change from point 16 to point 17, representing a degradation of signal strength from −21 db to −29 db. If the aircraft were at 17,500 ft. altitude, represented by the point 18 of intersection of the curves, exactly the same returned signal strength would be obtained with either frequency.

The preferred instrumentation of this method of reduction of the altitude hole effect is to provide apparatus for selecting the PRF in accordance with the signal-to-noise ratio. A signal representing this ratio is preferable to one representing merely absolute signal strength because the receiver operation is dependent upon the magnitude of the ratio rather than upon that of the received signal alone.

A block diagram of a portion of a Doppler radar transmitter-receiver is shown in Fig. 2. A radar transmitting and receiving antenna 21 is excited through a duplexing circuit 22 from a microwave pulse transmitter 23, including a magnetron and a driver-modulator. Modulation occurs at a pulse repetition frequency which may be varied between two or more values by signals received through a control conductor 24. The radar signal reflected from the earth and received by antenna 21 is transmitted through the duplexer 22 to a mixer and intermediate frequency preamplifier 25. The first stages of this preamplifier are controlled by a blanking gate received through conductor 26 from the modulator 23, this gate disabling the preamplifier during the transmitting pulse. The received signal emitted by the preamplifier 25 is further amplified and then detected in the intermediate amplifier and video detector unit 27. From the latter the audio signal is passed through a low-pass filter 28 and an audio amplifier 29 to a frequency tracker 31. The frequency tracker may take a number of forms, one such form being schematically represented by a modulator 32, filter 33, automatic gain control 34, oscillator 35, and integrator 36, with output representing aircraft ground track speed impressed on conductor 37. A signal-to-noise ratio $S/N$ detector 38 receives the filtered audio signal-plus-noise signal from the output of filter 33 and receives a signal representing only noise through a suitable filter 39 from the audio amplifier 29. The $S/N$ detector output, representing by its magnitude the $S/N$ signal amplitude, is transmitted to a switch circuit 41. This circuit 41 controls, through conductor 24, the selection of the pulse repetition frequency. A sampling rate generator 42 emits pulses of selected length at a selected frequency for the purpose of periodically changing the pulse repetition frequency for a brief interval and testing to ascertain whether or not the $S/N$ is improved by the change.

One form of $S/N$ detector 38 is depicted by the discriminator of Fig. 3, in which the fixed frequency signal from filter 33, which may have a frequency, for example, of 30,000 cycles but a variable amplitude mixed with a small amount of noise, is applied to the control grid 43 of a triode amplifier 44. A signal consisting of noise only is transmitted from noise filter 39 to the grid 46 of another triode amplifier 47. The two signals are rectified by diodes 48 and 49, and their ratio is represented by the direct voltage level of the output terminal 51. This voltage is integrated by capacitor 52, and is referred to the ground potential of the cathode/anode terminal 54. When the signal and noise potentials are equal, equal negative and positive potentials will be built up at terminals 56 and 57, respectively, resistors 58 and 59 being equal. If the signal be greater, the negative potential at terminal 56 will be greater than the positive potential at terminal 57, so that the potential of the intermediate terminal 51 is negative referred to ground.

The PRF sampling rate generator 42, Figs. 2 and 3, emits a short relay-actuating pulse periodically. During the occurrence of a pulse the circuit operation is tested and, during intervals between pulses, energy representing the potential of terminal 51 is stored in preparation for the next test. The test period and pulse length are not at all critical, and by way of example only, the intervals between test pulses may be one minute, and the pulse length 100 milliseconds.

Terminal 51 is connected by a conductor 61 to two storage capacitors 62 and 63. The other terminals of the capacitors are connected to the arms 64 and 66 of two switches having their outer contacts 67 and 68 grounded and their inner contacts 69 and 71 connected together and to the arm 72 of a step relay 73 having an actuating coil 74. The step relay 73 is also provided with a mechanical armature 76 which, by means of a pawl 77 and ratchet 78, advances a cam 79. Armature 76 is retracted by a spring 81. Cam 79 is provided with a cam follower, represented by dashed line 82, which is connected to switch arms 64, 66 and 83. The cam 79 is four sided, so that in one revolution it causes the follower to move through four cycles and to move the switches between their contacts. The forward contact 84 of switch arm 72 is connected to the control grid 86 of a triode 87 having a step relay coil 88 in its anode circuit. This step relay 88 is similar to relay 73, and its four-sided cam 89 operates a two-position switch arm 91. Contacts 92 and 93 of this switch are connected to contacts 94 and 96 of switch 83 respectively, and arm 91 is connected through conductor 97 to a relay coil 98.

Coil 98 is provided with two contact armatures 99 and 101. Armature 99 applies either of two positive potentials secured from voltage dividers 102 and 103 to one control grid 104 of a multivibrator comprising triodes 106 and 107. Armatures 101 applies either of two negative potentials secured from voltage dividers 108 and 109 to the other multivibrator control grid 111.

Multivibrator 106/107 generates a rectangular output voltage at its anode terminal 112 consisting of a long positive pulse followed by a short negative pulse. The pulse repetition frequency is mainly dependent upon the length of the long positive pulse which is determined by the negative bias voltage applied to grid 111. As example, frequencies of 100 kc. p. s. and 80 kc. p. s. may be selected, with the resistance values of dividers 108 and 109 chosen to provide these respective frequencies.

It is desired to maintain the ratio of the short pulse length to the total pulse period constant at some value such as, for example, 25%. To accomplish this the short pulse width must be changed when the pulse repetition frequency is changed. This is done by changing the bias applied to grid 104, by means of contact arm 99 and dividers 102 and 103, when the frequency is changed.

The multivibrator output is applied through a cathode follower 113 to a conventional hard tube pulser 114 controlling a magnetron 116, which emits bursts of microwave energy through its microwave output line 117. These bursts have durations equal to the short pulse length and a pulse repetition frequency of 80 or 100 kc. p. s. depending on whether the relay 98 is released or operated.

In the operation of the circuit depicted in Fig. 3, let it be assumed that the radar return strengths at the two pulse repetition frequencies of 80 and 100 kc. p. s. are represented by the graphs 11 and 12, respectively, of Fig. 1. Also let it be supposed that all switches are in their depicted positions, and that the pulse repetition frequency is 80 kc. p. s. The signal-to-noise ratio is greater than unity, so that a potential which is negative relative to ground is applied from discriminator terminal 51 through conductor 61 to the inner plates of capacitors 62 and 63. Let this potential be termed $V_{80}$. The outer plate of capacitor 62 is placed at ground potential through arm 64 engaging contact 67. The control grid 86 of triode 87 is held at ground potential by its leak resistor 85 and the tube characteristics are such that little or no anode current flows and anode relay coil 88 is unenergized.

When the PRF sampling rate generator 42 emits a 100 μs. pulse, relay coil 74 is energized and moves contact arms 64, 66 and 83 to engage contacts 69, 68 and 96 respectively. Arm 72 is also moved to engage contact 84, This occurs before arm 82 leaves contact 94 while separated from both its contacts and the grid 86 is not changed from ground to potential.

Referring to graph 11, Fig. 1, let it be assumed that the aircraft is at an altitude of 17,000 feet, so that the received signal strength, when PRF=80 kc. p. s., is represented by the point 13. However, when switch 83, Fig. 3, is operated to engage contact 96, relay 98 is operated and the frequency is changed to 100 kc. p. s., whereupon the signal strength rises to that of point 14, Fig. 1. This increases the negative potential of terminal 51, Fig. 3, to $V_{100}$. As the upper plate of capacitor 62 is not now connected to ground, the change of potential on the inner plate in the negative direction causes a corresponding decrement change on the outer plate, resulting in the application of a negative voltage of $V_{100} - V_{80}$ on grid 86. But since tube 87 anode current is already cut off, relay 88 is not affected. At the termination of the 100 μs. test period relay 73 releases but its contact arms 63, 66 and 83 remain in their last actuated positions. Contact arm 72 is released, opening the grid circuit. Relay 98 remains operated and the pulse repetition frequency remains 100 kc. p. s. At the next 100 μs. sampling period relay 73 is again operated and its arms 64, 66 and 83 engage contacts 67, 71 and 94, respectively. Relay 98 is released and the frequency is changed to 80 kc. p. s. and arm 72 engages contact 84. At this time the signal strength is decreased from point 14 to point 13, Fig. 1, and the negative potential of terminal 51 is decreased which results in raising the potential of the outer plate of capacitor 63 above ground. This increases the potential of grid 86 above ground, operating relay 88 and moving its contact arm 91 to its contact 92. This again changes the PRF to 100 kc. p. s., which increases the negative charge on the inner plate of capacitor 63, which in turn restores the outer plate to zero potential. This cuts off the anode current through relay 88, which releases but, since the step relay operates on energization and not on release, relay arm 91 remains on contact 92, so that the PRF value of 100 kc. p. s. is retained.

To recapitulate, the circuit periodically samples the signal-to-noise ratio using a new PRF and, if the S/N be higher, retains the new PRF but, if the S/N be lower, goes back to the former PRF.

It is obvious that a number of equivalent circuits may be designed to be operated from a signal such as that at terminal 51, representing S/N, and to control a modulating circuit such as that of Fig. 4. For example, in place of the step switches 73 and 88 one or more "flip-flop" electro-mechanical relay circuits may be substituted, or electronic tube or transistor stages may be employed to accomplish the same results.

A much simpler way of increasing the signal strength in altitude holes and also of reducing the calibration error caused by these holes is merely to switch at a regular rate between two or more pulse repetition frequencies in such manner as to average their effects. If in the example of Fig. 1 the rate were switched back and forth between 80 kc. p. s. and 100 kc. p. s., the two curves would be averaged and at any altitude the received signal strength would be the mean of the strengths of the two curves. Thus the mean minima would be raised some 20 db above the minima of either component curve, although the maxima would be somewhat reduced.

To accomplish periodic switching of pulse repetition frequency between two frequencies, a timer 118, Fig. 4, is provided emitting an alternating current having any desired wave form such as, for example, a sinusoidal or rectangular form. The frequency should be high enough to avoid interference with operation of the radar and speed-measuring components, and high enough for the radar receiver to integrate the received signals and at any altitude to respond to their average intensity and direction. The timer is substituted for the sample of Fig. 3 and its output is applied through conductor 97 to relay coil 98, Figs. 3 and 4 which switches the pulse repetition frequency as already described in connection with Fig. 3.

What is claimed is:

1. A pulse radar transmitter-receiver comprising, means for generating and transmitting pulse signals, means for receiving echo signals thereof, means for periodically varying the pulse repetition frequency of said generated and transmitted pulse signals, means for sampling the signal-to-noise ratio of said received echo signals, and means operated by the relative signal-to-noise ratio of received echo signals at different pulse repetition frequencies for adjusting said generating means to produce pulse signals having a pulse repetition frequency yielding received echo signals having the highest signal-to-noise ratio.

2. A pulse radar transmitter-receiver comprising, means for generating and transmitting pulse signals, means for receiving echo signals thereof, means for periodically altering the pulse repetition frequency of said generating means to one or the other of two selected values, means for determining the signal-to-noise ratio of the received echo signals, and means operated by the signal-to-noise ratio of the received echo signals at said one pulse repetition frequency relative to the signal-to-noise ratio of received echo signals as said other pulse repetition frequency for adjusting the basic pulse repetition frequency of said generating means to that one of said values which yields received echo signals having the highest signal-to-noise ratio.

3. A pulse radar transmitter-receiver comprising, means for generating and transmitting pulse signals, means for receiving echo signals thereof, a sampling generator for altering the repetition frequency of the pulse signals produced by said generating means during a sampling period, and means controlled by the magnitude of signals received during said sampling period relative to the magnitude of signals received at times other than said sampling period for adjusting the pulse repetition frequency of said generating means to yield an echo signal of the highest relative magnitude.

4. A pulse radar transmitter-receiver comprising, means for generating and transmitting pulse signals at either one of two selected pulse repetition frequencies, means for receiving echo signals thereof, a sampling generator for changing the pulse repetition frequency of said generating means from one of its selected pulse repetition frequencies to the other of its selected pulse repetition frequencies during a sampling period, comparison means connected to said receiver for comparing the signal-to-noise ratio of the echo pulse signals received during said sampling period with those received during a period of time other than said sampling period, and means operated by said comparison means to operate said generating means at times other than said sampling period of that one of its selected pulse repetition frequencies which produces the higher magnitude echo signal.

5. A pulse radar transmitter-receiver comprising, means for generating and transmitting pulse signals at either one of two selected pulse repetition frequencies, switching means for changing the pulse repetition frequency of said generating means from one of its selected pulse repetition frequencies to the other thereof during a selected sampling period, receiving means for receiving reflected transmitted echo signals, signal-to-noise detector means producing a direct current signal the magnitude of which is proportional to the signal-to-noise ratio of received echo signals, and switch means operated by said direct current signal to normally operate said generating means at that one of its pulse repetition frequencies which produces the higher direct current signal.

References Cited in the file of this patent

UNITED STATES PATENTS

| | | |
|---|---|---|
| 2,415,095 | Varian | Feb. 4, 1947 |
| 2,671,896 | De Rosa | Mar. 9, 1954 |